United States Patent [19]
Osenbaugh

[11] Patent Number: 5,562,186
[45] Date of Patent: Oct. 8, 1996

[54] PISTON SEAL

[75] Inventor: Carl D. Osenbaugh, Ypsilanti, Mich.

[73] Assignee: Dana Corporation, Toledo, Ohio

[21] Appl. No.: 409,184

[22] Filed: Mar. 23, 1995

[51] Int. Cl.$^6$ ................................ F16D 65/20
[52] U.S. Cl. ................ 188/72.4; 92/240; 188/264 D; 188/322.16
[58] Field of Search .............. 188/72.4, 72.5, 188/71.5, 322.16, 322.18, 264 D, 71.6; 92/245, 240; 277/212 C, 212 R, 212 F, 207 R

[56] References Cited

U.S. PATENT DOCUMENTS

| | | | |
|---|---|---|---|
| 1,372,760 | 3/1921 | Loudenbeck | 277/212 C |
| 2,077,906 | 4/1937 | Stevens | 92/240 |
| 2,307,671 | 1/1943 | Dodge | 92/245 |
| 2,444,569 | 3/1943 | Katcher | 60/588 |
| 2,906,522 | 9/1959 | White | 277/228 |
| 3,028,935 | 4/1962 | Gold et al. | 188/264 D |
| 3,158,379 | 11/1964 | Nava et al. | 277/206 R |
| 3,915,262 | 10/1975 | Klaue | 188/264 D X |
| 3,940,938 | 3/1976 | Durham et al. | 60/588 |
| 4,116,452 | 9/1978 | Schanz | 92/240 X |
| 4,511,152 | 4/1985 | Fournier | 277/207 A |
| 4,858,516 | 8/1989 | Klein | 92/240 |
| 5,353,689 | 10/1994 | Bolt et al. | 92/240 X |

*Primary Examiner*—Josie Ballato
*Attorney, Agent, or Firm*—Oldham & Oldham Co., LPA

[57] ABSTRACT

A seal for use with an annular piston which may be used in a hydraulic system for actuating disc brakes or clutches of drivetrain subassemblies. The seal may be used with a piston having a relatively large average diameter and a relatively small radial thickness, with the piston being disposed, and axially moveable, within an annular passage having a pair of generally cylindrical, opposing side walls. The seal is made of an elastomeric material and comprises first and second annular flange portions having a first end attached to the base portion and a second, free end. Each of the flange portions diverge away from the base portion so as to dispose the corresponding free end in sealing engagement with one of the passage sidewalls. The base portion of the seal is bonded to an end surface of the piston and the seal further includes a plurality of circumferentially spaced ribs interconnecting the first and second flange portions.

8 Claims, 3 Drawing Sheets

5,562,186

PISTON SEAL

CROSS REFERENCE

This application is related in subject matter to commonly assigned and concurrently filed U.S. patent application Ser. No. 08/409,313 pending, (Attorney Docket Number 5894-PP).

BACKGROUND OF THE INVENTION

1. Field of the Invention

The invention relates generally to a seal and, more particularly, to an annular seal for use with an annular piston included in a hydraulic system which may be used to actuate a disc brake assembly.

2. Related Art

As known in the art, dry friction brakes are subject to contamination due to exposure to the vehicles environment, and are also prone to excessive heat build up due to the frictional interaction among components. Each of these factors may adversely affect the service life of the brake assembly. Disc brake assemblies in which the discs are bathed in a coolant fluid, commonly referred to as wet disc brake assemblies, are known in the art and have been used in certain applications to overcome the aforementioned problems associated with dry friction brakes. However, the use of wet disc brakes in certain applications has heretofore been limited due to spacial considerations. For instance, the envelope of prior wet disc brake assemblies may adversely impact the scrub radius and kingpin inclination angle of an associated steerable axle assembly. In a known wet disc brake system, the interleaved discs of the brake assembly are actuated by an annular piston which is sealed at one location to a housing surrounding the piston by an annular seal disposed in a groove formed in the piston. This arrangement is typical of many piston applications which include seals such as O-rings disposed in an annular groove formed in the piston. In certain applications, the radial thickness of the piston annulus may be insufficient, or too small, to accept a convention O-ring groove. The increase in the piston annulus which would be required to accept an O-ring groove may be unacceptable since such an increase in thickness would result in an increase in the volumetric displacement of fluid as the piston is actuated, which in turn may require an undesirable addition of an accumulator in the vehicle fluid system. Accordingly, automotive design engineers continue to search for novel means for sealing annular pistons for use in actuating components such as wet disc brakes, or disc-type clutches.

SUMMARY OF THE INVENTION

Accordingly, the present invention is directed to a seal for use with an annular piston which is disposed within an annular passage having a pair of generally cylindrical opposing sidewalls. The piston is axially moveable within the passage. According to a preferred embodiment, the seal comprises an annular base portion and first and second annular flange portions which are radially spaced from one another and include a first end attached to the base portion. Each of the first and second flange portions further includes a second, free end, and extends radially and axially away from the base portion so as to dispose the free end of the corresponding flange portion in sealing engagement with one of the sidewalls of the passage. The base portion and the first and second flange portions are made of an elastomeric material and the base portion is bonded to an end surface of the piston.

A main advantage of the seal of the present invention is the ability to utilize a relatively large diameter piston having a relatively small wall thickness, not suitable for accepting O-ring grooves, in a disc brake or clutch actuation assembly, thereby minimizing the quantity of hydraulic fluid required to actuate the brake or clutch assembly.

BRIEF DESCRIPTION OF THE DRAWINGS

The structural features and function of the present invention, as well as the aforementioned and other advantages derived therefrom, will become more apparent from the subsequent detailed description of the preferred embodiments when taken in conjunction with the accompanying drawing, wherein.

DETAILED DESCRIPTION

Figure 1:
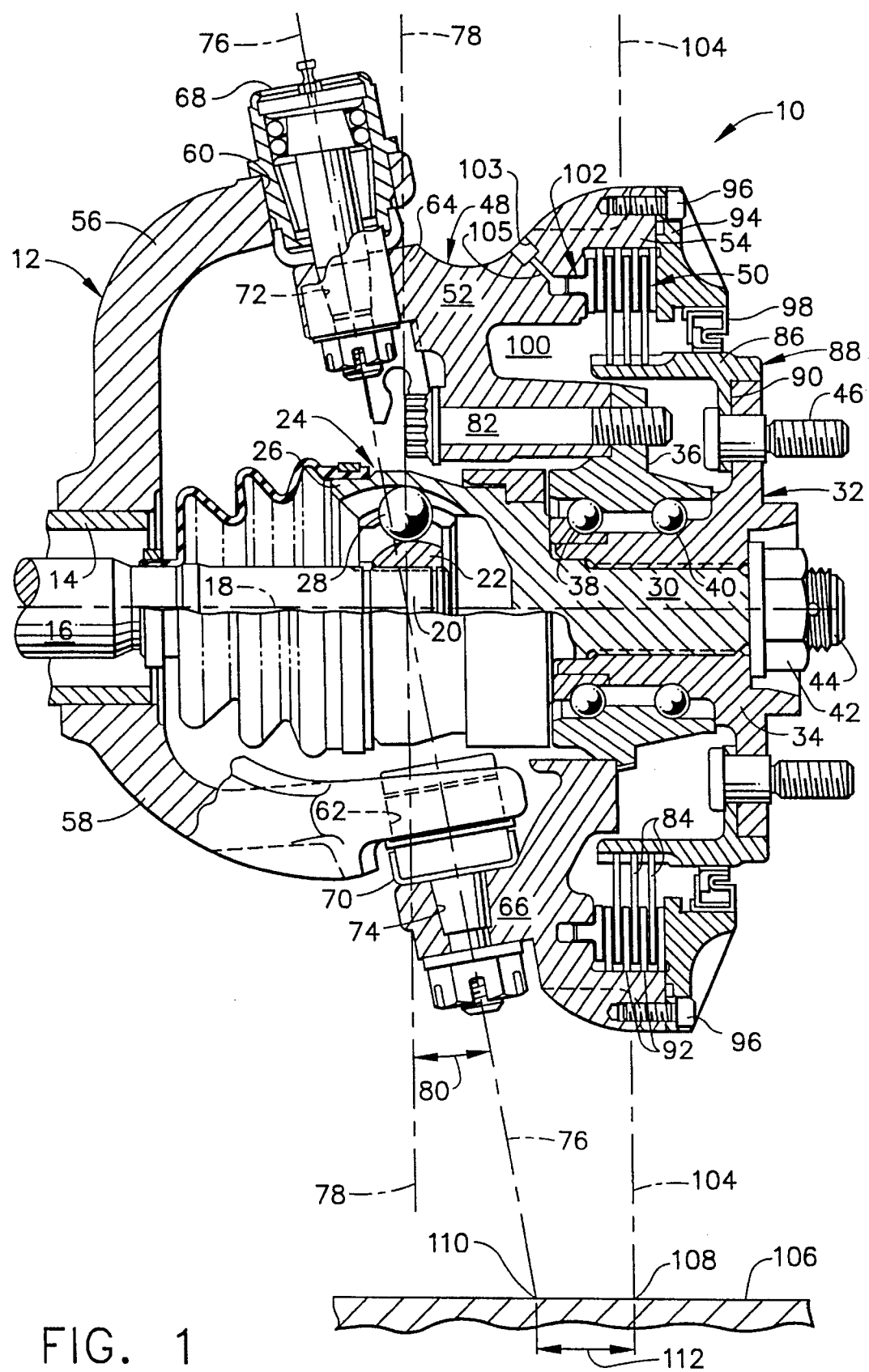
FIG. 1 is a cross-sectional view illustrating a steerable axle assembly according to a preferred embodiment of the present invention.

FIG. 1 is a cross-sectional view illustrating a steerable axle assembly 10 according to a preferred embodiment of the present invention. Axle assembly 10 includes a tube yoke, indicated generally at 12, attached to an axle tube 14 of a motor vehicle at an outboard end of the tube 14. An axle shaft 16, which may originate from a differential (not shown), is disposed within the axle tube 14 and is rotatable about a centerline axis 18 of the assembly 12. Axle shaft 16 carries, at an outboard end 20, an inner race 22 of a constant velocity (CV) joint indicated generally at 24. CV joint 24 further includes an outer race 26 and torque transmitting bails 28 (only one shown) disposed in grooves formed in the inner race 22 and outer race 26 of CV joint 24. In the illustrated embodiment shown in FIG. 1, the outer race 26 of CV joint 24 is integrally formed with a wheel spindle 30. Alternatively, outer race 26 may be fastened to spindle 30. However, the particular relationship between outer race 26 and spindle 30 does not form a part of the present invention. Axle assembly 10 further includes a unit hub bearing assembly, indicated generally at 32, which includes a wheel hub 34 splined to the wheel spindle 30 for rotation therewith and a stationary outer race 36. The wheel hub 34 is rotatably supported by outer race 36 via inboard and outboard bearings 38 and 40, respectively. Wheel hub 34 is retained on spindle 30 by a nut 42 threaded onto an outboard end 44 of spindle 30. The vehicle wheels (not shown) are mounted to the wheel hub 34 via studs 46 extending through and protruding from wheel hub 34. During operation of the vehicle, torque is transmitted from axle shaft 16 through CV joint 24 to wheel spindle 30 and wheel hub 34 to the vehicle tires mounted on hub 34.

Axle assembly 10 further includes a unitary structure which incorporates the structural features and functions of prior steering knuckles and brake housings, which will hereinafter be referred to as a bruckle, indicated generally at 48. Assembly 10 also includes a disc brake assembly indicated generally at 50. The specific construction of bruckle 48 and disc brake assembly 50, as well as the interrelationship between bruckle 48 and brake assembly 50, comprise central features of the present invention. Bruckle 48 is rotatably attached to tube yoke 12, as subsequently discussed in greater detail. Bruckle 48 includes a steering knuckle portion 52 and a brake housing portion 54. Bruckle 48 preferably comprises a one-piece casting, so that the steering knuckle portion 52 and brake housing portion 54 are integrally formed with one another, and is preferably made of a malleable steel alloy or iron. Alternatively, bruckle may be made of other suitable materials and may be made of a one-piece construction using manufacturing methods other than casting, such as forging. Bruckle 48 is preferably manufactured as a one-piece casting, for purposes of minimizing the scrub radius of the vehicle tires as subsequently discussed. Tube yoke 12 includes vertically spaced upper and lower arms 56 and 58, respectively. Upper arm 56 includes a generally cylindrical bore 60 formed therethrough and similarly, lower arm 58 includes a generally cylindrical bore 62 formed therethrough. The steering knuckle portion 52 includes an upper flange 64 disposed adjacent the upper arm 56 of tube yoke 12, and a lower flange 66 disposed adjacent the lower arm 58 of tube yoke 12. The steering knuckle portion 52 is rotatably attached to the tube yoke 12 by upper and lower ball joints 68 and 70, respectively. Upper ball joint 68 is disposed in the bore 60 formed through the upper arm 56 of tube yoke 12 and a tapered bore 72 formed in the upper flange 64 of the steering knuckle portion 52. The lower ball joint 70 is disposed in the bore 62 extending through the lower arm 58 of tube yoke 12 and a tapered bore 74 extending through the lower flange 66 of the steering knuckle portion 52. Upper ball joint 68 and lower ball joint 70 each have a longitudinal axis which are coincident with one another and comprises an axis 76, commonly referred to as the kingpin axis. As shown in FIG. 1, the kingpin axis 76 is inclined relative to a vertical axis 78 by an inclination angle 80. Ball joints 68 and 70 function in a conventional manner so as to permit the steering knuckle portion 52 to pivot about the kingpin axis 76. The steering knuckle portion is fastened to the stationary outer race 36 of the unit hub bearing assembly 32 by a plurality of circumferentially spaced bolts 82 (only one shown). Accordingly, the steering knuckle portion 52 is coupled to wheel hub 34 so as to permit steering action of the vehicle as bruckle 48 pivots about the kingpin axis 76.

The disc brake assembly 50 includes a plurality of annular drive discs 84 which are splined at an inner end thereof, to a generally axially extending portion 86 of a sleeve member 88, so as to permit some axial movement of discs 84 relative to sleeve 88. The sleeve member 88 includes a generally radially extending flange portion 90 which is fastened to the wheel hub 34 via bolts, or studs 46. Accordingly, sleeve member 88 and drive discs 84 rotate with wheel hub 34 about the longitudinal centerline axis 18 of assembly 10. Disc brake assembly 50 further includes a plurality of non-rotatable annular intermediate discs 92 which are splined, at an outer end thereof, to the brake housing portion 54 of bruckle 48, so as to permit some axial movement of discs 92 relative to bruckle 48. Individual ones of the intermediate discs 92 are interleaved with the individual ones of the drive discs 84. Axle assembly 10 further includes an annular end cap 94 which is fastened to the brake housing portion 54 of bruckle 48 by conventional means such as bolts 96. End cap 94 is positioned outboard of disc brake assembly 50 and may be in abutting relationship with an outboard one of the intermediate discs 92. An annular seal 98 is disposed between an inner surface of end cap 94 and an outer surface of sleeve member 88 so as to seal an outboard end of a cavity 100 containing a liquid which may comprise a class C transmission fluid, or other liquids having a friction modifier. The various discs of brake assembly 50 are bathed in the liquid contained within cavity 100 for purposes of heat dissipation. Accordingly, disc brake assembly 50 comprises a wet disc brake assembly and exhibits an increased service life relative to otherwise similar dry friction brake assemblies. To further enhance the dissipation of heat created during the actuation of brake assembly 50, end cap 94 is preferably made of an aluminum alloy. Alternatively, end cap 94 may be made of other metallic alloys having suitable mechanical strength and coefficients of thermal expansion comparable to that of aluminum.

Disc brake assembly 50 may be actuated by a hydraulic system which includes an annular piston, indicated generally at 102. The hydraulic system further includes an annular seal 104 according to the present invention. Liquid, such as the aforementioned class C transmission fluid, is supplied from an external source (not shown) to an inlet port 103 on bruckle 48 and flows through a radially inwardly extending passage 105 to an annular passage 106 formed in bruckle 48. Passage 106 includes generally cylindrical, opposing sidewalls 108 and 110. Annular piston 102 includes a high pressure end portion 112 disposed within passage 106 and a low pressure end portion 114 disposed proximate one of the non-rotatable intermediate discs 92 of disc brake assembly 50. Relatively small annular clearances exist between the high pressure end portion 112 and each of the sidewalls 108 and 110 of passage 106 so that piston 102 is axially moveable within the brake housing portion 54 of bruckle 48. Seal 104 is attached to the high pressure end portion 112 of piston 102, as subsequently discussed in greater detail, and is in sealing engagement with passage 106 so as to prevent the leakage of liquid through the annular clearances formed between high pressure end portion 112 and sidewalls 108 and 110 of passage 106. In response to the hydraulic pressure of the liquid contained within passage 106 and applied to the high pressure end portion of piston 102, via seal 104, drive discs 84 are urged into frictional engagement with intermediate discs 92 by piston 102, so as to retard or completely stop the rotation of wheel hub 34. In the illustrated embodiment three drive discs 84 are used in conjunction with four intermediate discs 92. However, other numbers of discs 84 and 92 may be used dependent upon the required torque capacity, and therefore the required number of frictional engagement faces, of disc assembly 50.

Figure 2:
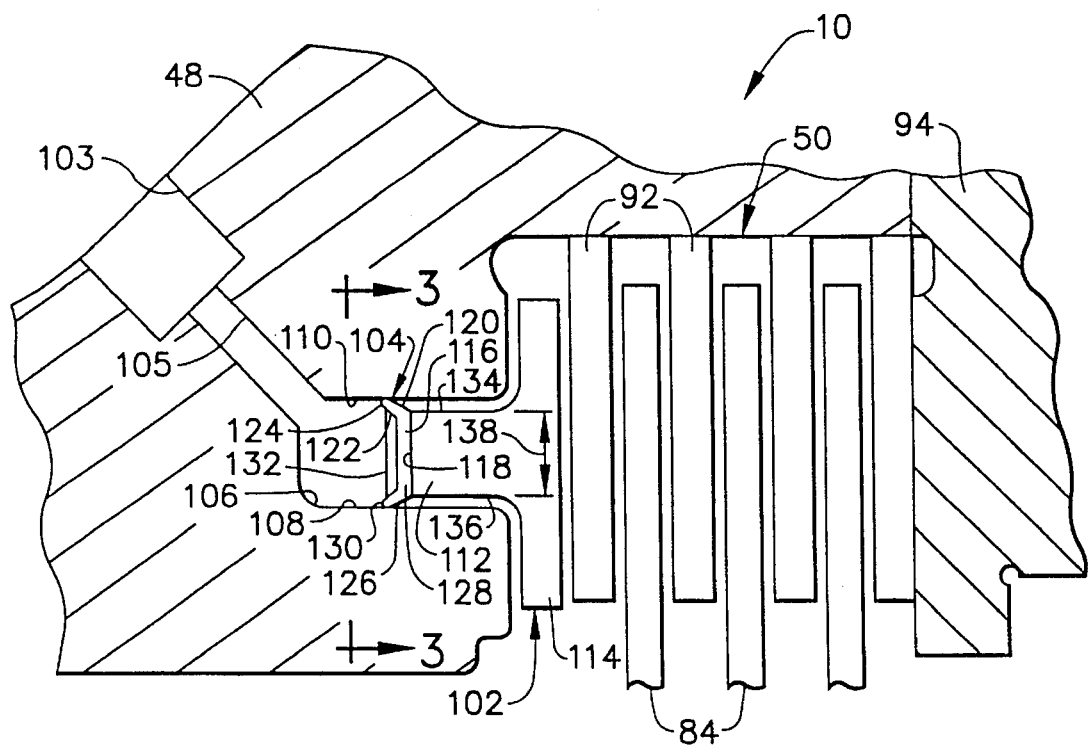
FIG. 2 is an enlarged, partial cross-sectional view illustrating the seal of the present invention.
Figure 3:
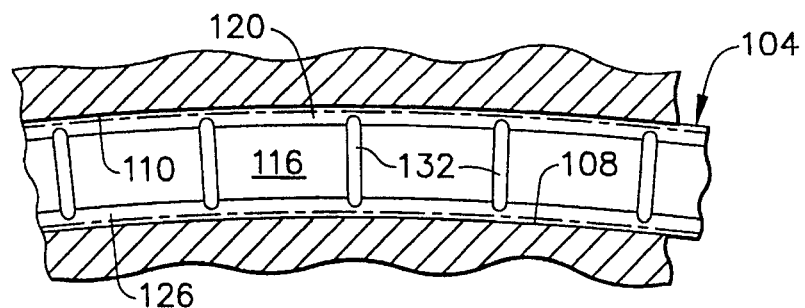
FIG. 3 is a partial view further illustrating the seal shown in FIGS. 1 and 2, taken along line 3—3 in FIG. 2.

Referring now to FIGS. 2 and 3, the specific construction and function of annular seal 104 is further discussed. Seal 104 includes an annular base portion 116 which is attached to a high pressure end surface 118 of high pressure end portion 112 of piston 102. Preferably, base portion 116 is bonded, with conventional adhesives, to end surface 116 of piston 102. Seal 104 further includes a first annular flange portion 120 having a first end 122 attached to base portion 116 and a second, free end 124. Flange portion 120 extends radially and axially away from base portion 116 so as to dispose the free end 124 in sealing engagement with sidewall 110 of passage 106. Seal 104 further includes a second annular flange portion 126 which is radially spaced from the first flange portion 120 and includes a first end 128 attached to base portion 116 and a second, free end 130. The second flange portion 126 extends radially and axially away from base portion 116 so as to dispose the free end 130 in sealing engagement with sidewall 108 of passage 106. Seal 104 further includes a plurality of circumferentially spaced and transversely extending ribs 132, as best seen in FIG. 3. Ribs 132 are attached to each of the flange portions 120 and 126, so as to interconnect flange portions 120 and 126. Base portion 116, flange portions 120 and 126, and ribs 132 are made of an elastomeric material and are integrally formed as a one-piece construction. The resilient nature of flange portions 120 and 126 permits flange portions 120 and 126 to be disposed in sealing engagement with sidewalls 110 and 108, respectively of passage 106 due to the hydrostatic pressure of the liquid contained within passage 106. The use of ribs 132 facilitates the sealing engagement of flange potions 120 and 126 with sidewalls 110 and 108, during conditions when this hydrostatic pressure is relatively low. Since the base portion 116 of seal 104 is bonded to the high pressure end surface 118 of piston 102, it is unnecessary to provide a conventional seal disposed between the axially extending surfaces 134 and 136 of high pressure end portion 112 and the adjacent sidewalls 110 and 108, respectively, of passage 106. Accordingly, the radially extending annular thickness 138 of the high pressure end portion 112 of piston 102 may be relatively small and since it is unnecessary to include a conventional seal receptacle such as an O-ring groove in the end portion 112. Accordingly, the volumetric displacement of the liquid within passage 106 is minimized during the actuation of piston 102.

Figure 4:
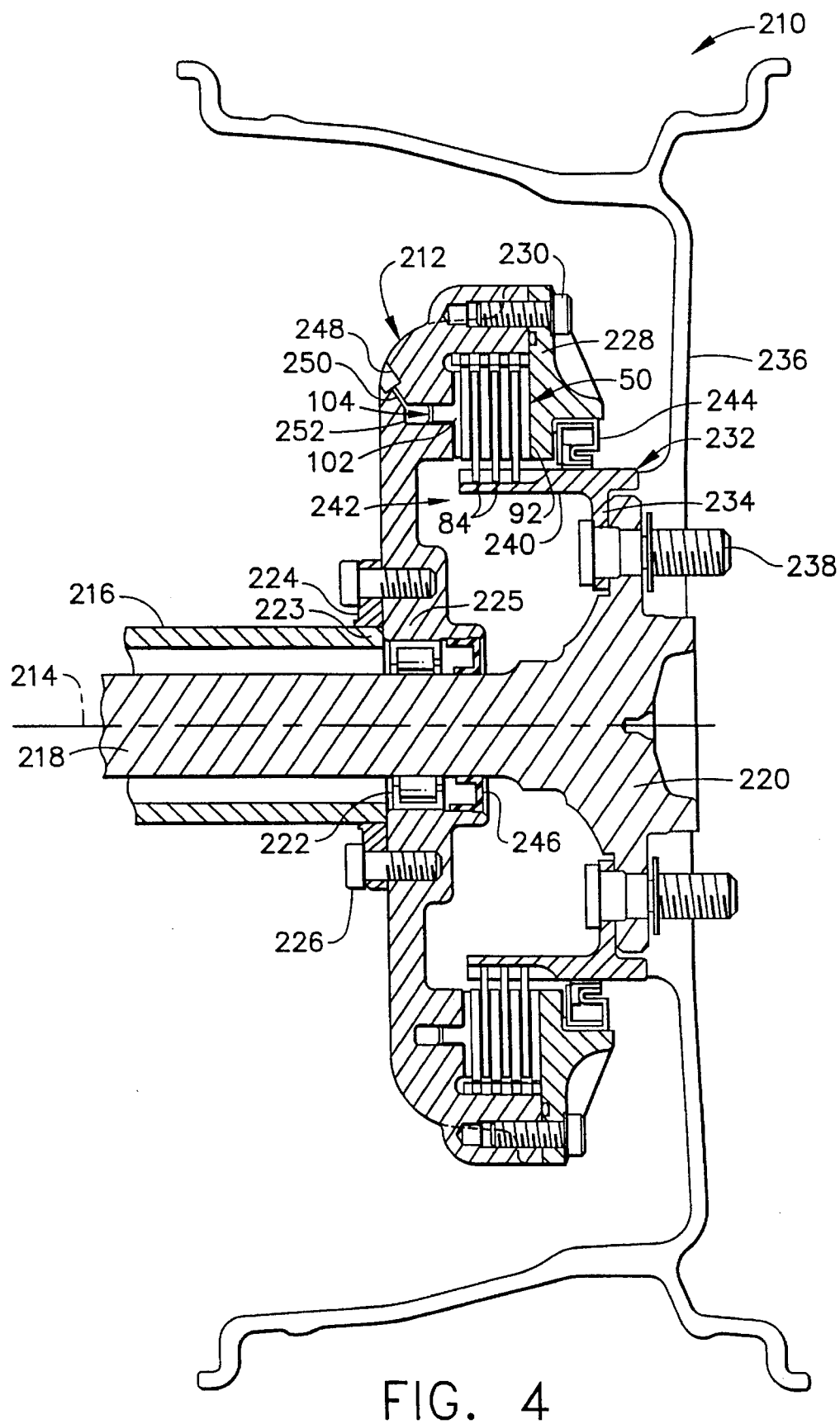
FIG. 4 is a cross-sectional view illustrating a non-steerable axle assembly according to an alternative embodiment of the present invention.

Referring now to FIG. 4, an axle assembly 210 is illustrated according to an alternative embodiment of the present invention. Like assembly 10, axle assembly 210 includes a wet disc brake assembly 50, a piston 102 which is used to actuate disc brake assembly 50 and a seal 104 which is attached to piston 102. Disc brake assembly 50, piston 102 and seal 104 are structured and function as described previously with respect to axle assembly 10. However, axle assembly 210 differs from assembly 10 in the following regards. While axle assembly 10 comprises a steerable axle assembly, axle assembly 210 comprises a non-steerable axle assembly. Accordingly, axle assembly 210 does not include a bruckle having a steering knuckle portion and a brake housing portion, but instead includes a brake housing 212, with disc brake assembly 50 disposed within brake housing 212. Axle assembly 210 includes a centerline axis 214 and an axle tube 216 disposed coaxially about axis 214. A rotatable axle shaft 218, which may originate from a differential (not shown) is disposed partially within axle tube 216 and terminates in flange 220 at an outboard end thereof. Flange 220 of shaft 218 is disposed axially outboard of axle tube 216. Shaft 218 is rotatably supported within brake housing 212 by bearing assembly 222. A radially extending flange 224 is attached to an outboard end 223 of axle tube 216 and may be integrally formed with axle tube 216. Flange 224 is attached to an inner portion 225 of brake housing 212 by conventional means such as bolts 226, so as to attach, or connect, axle tube 216 to brake housing 212. Similar to assembly 10, assembly 210 includes an annular end cap 228 which is fastened to brake housing 212 by conventional means such as bolts 230 and is disposed proximate an outboard end of disc brake assembly 50. During actuation of disc brake assembly 50, end cap 228 is disposed in abutting relationship with an outboard one of the non-rotatable, intermediate discs 92, so as to react the actuation load applied to disc brake assembly 50. An annular sleeve member, indicated generally at 232, includes a radially extending flange portion 234 which is fastened to flange 220 of shaft 218 and to wheel hub 236 by conventional means such as bolts 238. Accordingly, sleeve member 232 rotates with shaft 218 and wheel hub 236 about centerline axis 214. Each of the annular drive discs 84 of disc brake assembly 50 are splined to an axially extending portion 240 of sleeve member 232 for rotation therewith and are therefore also coupled for rotation with axle shaft 218. The discs 84 and 92 of brake assembly 50 are bathed in a liquid, such as that described with respect to cavity 100 of assembly 10, contained within a cavity 242 which is sealed at an outboard end by an annular seal 244 disposed between sleeve member 232 and end cap 228. Cavity 242 is sealed at an inboard end by an annular seal 246 which is disposed between brake housing 50 and shaft 218.

Liquid is supplied from an external source (not shown) to an inlet port 248 formed in brake housing 212 and then flows through a radially inwardly extending passage 250 to an annular passage 252 formed in brake housing 212. The high pressure end portion 112 of piston 102 is disposed within passage 252 and, similar to assembly 10, relatively small annular clearances exist between the high pressure end portion 112 of piston 102 and each of the opposing sidewalls of passage 252 so that piston 102 is axially moveable within housing 212. Seal 104 is bonded to piston 102 as described previously with respect to assembly 10 and seal 104 prevents the leakage of liquid between the high pressure end portion 112 of piston 102 and the opposing sidewalls of passage 252. In response to the hydrostatic pressure of the liquid contained within passage 252 at a location inboard of seal 104, piston 104 is urged against disc brake assembly 50 so as to apply an actuation force brake assembly 50. Accordingly, in response to the hydraulic pressure applied to piston 102, drive discs 84 are urged into frictional engagement with intermediate discs 92 of brake assembly 50 by piston 102, so as to retard or completely stop the rotation of wheel hub 236.

While the foregoing description has set fourth the preferred embodiments of the invention in particular detail, it must be understood that numerous modifications, substitutions, and changes can be undertaken without departing from the true spirit and scope of the present invention as defined by the ensuing claims. For instance, although the seal 104 has been illustrated for use with an annular piston 102 included in a disc brake actuation system, the seal may be used in conjunction with pistons included in other types of hydraulic actuation systems such as those used to actuate a disc type clutch having interleaved sets of discs. Additionally, the seal may further be advantageously utilized with annular members other than pistons. The invention is therefore not limited to specific preferred embodiments as described, but is only limited as defined by the following claims.

What is claimed is:

1. A seal for use with an annular piston disposed within a housing, the piston having a high pressure end portion disposed within an annular passage formed within the housing, the piston being axially moveable within the housing, the passage having a pair of generally cylindrical opposing sidewalls, said seal comprising:

an annular base portion;

a first annular flange portion having a first end attached to said base portion and a second, free end, said first flange portion extending radially and axially away from said base portion so as to dispose said free end in sealing engagement with one of the sidewalls of the passage;

a second annular flange portion radially spaced from said first flange portion, said second flange portion having a first end attached to said base portion and a second, free end, said second flange portion extending radially and axially away from said base portion so as to dispose said free end in sealing engagement with the other of the sidewalls of the passage;

a plurality of circumferentially spaced and transversely extending ribs interconnecting said first and second flange portions;

wherein said base portion is in contacting engagement with an end surface of the piston and wherein said base portion, said first and second flange portions and said ribs are made of an elastomeric material.

2. The seal as recited in claim 1, wherein:

said base portion is bonded to an end surface of the piston.

3. An axle assembly for use in a motor vehicle, said assembly comprising:

a housing;

a disc brake assembly disposed within said housing and bathed in a liquid;

an annular passage formed in said housing, said passage having a pair of generally cylindrical opposing sidewalls;

an annular piston disposed within said passage and disposed proximate said disc brake assembly, wherein said piston is axially moveable within said passage and may be urged against said disc brake assembly in response to hydraulic pressure applied to a high pressure end portion of said piston;

a seal having an annular base portion and further including first and second annular flange portions, each of said flange portions being attached at a first end thereof to said base portion, wherein said first and second flange portions extend radially and axially away from said base portion so as to dispose a free end of each of said first and second flange portions in sealing engagement with one of said sidewalls of said passage;

a plurality of circumferentially spaced and transversely extending ribs interconnecting said first and second flange portions;

wherein said base portion of said seal is bonded to said high pressure end surface of said piston.

4. The axle assembly as recited in claim 5, wherein said seal is made of an elastomeric material.

5. The axle assembly as recited in claim 4, further comprising:

a centerline axis;

an axle tube coaxially disposed about said centerline axis;

a radially extending, annular flange attached to an outboard end of said axle tube;

wherein said housing comprises a brake housing having an inner portion attached to said flange.

6. The axle assembly as recited in claim 5, further comprising:

a rotatable axle shaft coaxially disposed about said centerline axis and partially disposed within said axle tube, wherein an outboard end of said axle shaft is disposed axially outboard of said axle tube;

wherein said disc brake assembly includes a plurality of annular drive discs coupled to said axle shaft for rotation therewith and a plurality of non-rotatable, annular intermediate discs splined to said brake housing, said drive discs and said intermediate discs being axially moveable and interleaved with one another.

7. The axle assembly as recited in claim 4, further comprising:

a centerline axis;

an axle tube disclosed coaxially about said centerline axis;

a tube yoke attached to said axle tube;

wherein said housing comprises a brake housing portion of a bruckle, said bruckle further including a steering knuckle portion which is rotatably attached to said tube yoke.

8. The axle assembly as recited in claim 7, further comprising:

a rotatable wheel hub coaxially disposed about said centerline axis;

wherein said disc brake assembly includes a plurality of annular drive discs coupled to said wheel hub for rotation therewith and a plurality of non-rotatable, annular intermediate discs splined to said brake housing portion.

* * * * *